United States Patent [19]
Kobori et al.

[11] Patent Number: 5,146,323
[45] Date of Patent: Sep. 8, 1992

[54] SIGNAL PROCESSING CIRCUIT INCLUDING A WHITE BALANCE ADJUSTING CIRCUIT IN A COLOR VIDEO PRINTER APPARATUS

[75] Inventors: Yasunori Kobori, Yokohama; Kentaro Hamma, Katsuta; Yoshiaki Mochimaru, Yamato, all of Japan

[73] Assignees: Hitachi, Ltd, Tokyo; Hitchi Video Engineering Incorporated, Kanagawa, both of Japan

[21] Appl. No.: 413,774

[22] Filed: Sep. 28, 1989

[30] Foreign Application Priority Data

Oct. 3, 1988 [JP] Japan .................. 63-247361

[51] Int. Cl.$^5$ .................................... G03F 3/10
[52] U.S. Cl. ........................ 358/76; 358/75; 358/29
[58] Field of Search ............... 358/75, 76, 29 C; 355/38

[56] References Cited

U.S. PATENT DOCUMENTS

| | | | |
|---|---|---|---|
| 4,489,345 | 12/1984 | Itani et al. | 358/29 C |
| 4,584,598 | 4/1986 | Kutaragi | 358/29 |
| 4,736,241 | 4/1988 | Mulakami | |
| 4,743,759 | 3/1988 | Kobori et al. | |
| 4,814,861 | 3/1989 | Hieda | 358/29 C |
| 4,860,092 | 8/1989 | Hieda | 358/29 C |
| 4,901,152 | 2/1990 | Hieda et al. | 358/29 C |
| 4,907,076 | 3/1990 | Ohsawa | 358/29 C |
| 4,924,316 | 5/1990 | Kobayashi et al. | 358/43 |

FOREIGN PATENT DOCUMENTS

| | | |
|---|---|---|
| 356123 | 2/1990 | European Pat. Off. |
| 62-43291 | 2/1987 | Japan . |
| 32586 | 2/1989 | Japan . |

OTHER PUBLICATIONS

Proceedings Lectures of National Conference, The Institute of Television Engineers of Japan, pp. 83, 84, 1986, "The Examination of the Automatic White Balance System for Color Video Camera", Toshio Murakami et al.

Film Technology (The Broadcasting Society of Japan by supervision of Ryo Takahashi) p. 34.

Primary Examiner—James J. Groody
Assistant Examiner—Kim Yen Vu
Attorney, Agent, or Firm—Antonelli, Terry, Stout & Kraus

[57] ABSTRACT

White balance adjusting apparatus for controlling the levels among RGB signals of the video signals and adjusting the white balance of the video image is provided in a color video printer apparatus which receives the video signals and prints out. Prior to color printing, the white balance is adjusted, thereby enabling a good color reproduction to be obtained.

10 Claims, 12 Drawing Sheets

CENTER CONTROL VOLTAGE (V)

(a)  (b)

IMAGE MEMORY 112

OVERLAY MEMORY 502

OVERLAY CHARACTERS

PRINT/MONITOR IMAGE

SIGNAL PROCESSING CIRCUIT INCLUDING A WHITE BALANCE ADJUSTING CIRCUIT IN A COLOR VIDEO PRINTER APPARATUS

BACKGROUND OF THE INVENTION

The present invention relates to a color video printer and, more particularly, to a color video printer which is suitable to obtain a hard copy of video images which were photographed by a home-use video movie or the like.

Literature regarding the construction of a video printer, U.S. Pat. No. 4,734,759 has been known. Also literature concerning the automatic white balance of the video camera, U.S. Pat. No. 4,736,241 has been known.

Japanese patent application JP-A-62-43291 discloses a system for obtaining a hard copy such as a photograph from a video signal.

However, in the technique disclosed in JP-A-62-43291, no consideration is given to white balance adjustment. Particularly, in the case of obtaining a video print from video media such as a home-use video movie or the like, a good color reproduction is not obtained for a video signal photographed in a state in which the white balance is not properly adjusted.

SUMMARY OF THE INVENTION

It is an object of the present invention to obtain a good video print even from a video signal photographed in a state in which the white balance is not properly adjusted.

Another object of the invention is to execute the white balance adjustment and to obtain a high quality video print.

Still another object of the invention is to provide a video printer which can adjust the white balance in accordance with the desire of an operator.

Further another object of the invention is to provide a construction of a video printer which is suitable to execute the automatic adjustment of the white balance.

Further another object of the invention is to provide a video printer which can obtain a beautiful video print of the image of a human.

Further another object of the invention is to preferably execute the automatic white balance adjustment in a video printer with an overlay function.

According to the invention, white balance adjusting means for correctly adjusting the white balance of a video signal to be video printed is newly provided in the video printer, and before printing, the white balance of the video signal is readjusted, and the video print is obtained from the signal.

The white balance adjusting means operates so as to readjust the white balance of the video signal to be video printed. Thus, the white balance of the video signal is correctly adjusted, so that even from a video signal photographed in a state in which the white balance is not properly adjusted in, particularly, skin color or the like, after the good color reproduction was executed, the video print can be executed.

DESCRIPTION OF THE PREFERRED EMBODIMENTS

Detailed embodiments of the present invention will be described hereinbelow.

Figure 1:
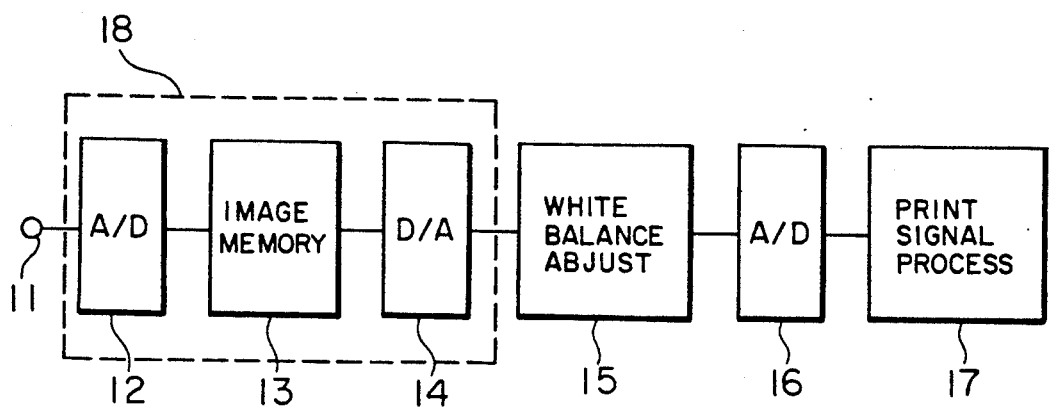
FIGS. 1, 2, and 3 are constructional diagrams of video printers according to the present invention, respectively.

An example of a construction of a video printer according to the invention will be first described by using FIG. 1.

In the diagram, reference numeral 11 denotes an input terminal of the video signal; 12 indicates an analog/digital converter (hereinafter, referred to as an A/D converter); 13 an image memory having the size of a frame or a field corresponding to one picture plane of the video signal; 14 a digital/analog converter; 15 a white balance adjuster; 16 an A/D converter for printing; 17 a print signal processing circuit; and 18 a portion constructing still image memory means.

The operation will now be described. The video signal input from the input terminal 11 is converted into a digital signal by the A/D converter 12 and stored into the image memory 13. The stored video signal is converted into the analog signal by the D/A converter 14 and output as a still image of one picture plane. The amplification factors among the RGB signals in the still image signal of one picture plane are adjusted by the white balance adjuster 15. Then, the image signal is input to the A/D converter 16 for printing and again converted into the digital signal. Thereafter, it is video printed by the print signal processing circuit 17.

As printing methods, a thermal copy transfer system using a sublimation ink, an ink jet system, and the like have been known. It is sufficient to use the proper system in accordance with the expected use of the printed copy.

In the example, after the white balance of an output of the still image memory means 18 was adjusted, the resultant signal is input to the A/D converter for printing. Therefore, the signal which is used to print is the signal whose white balance was adjusted. A deviation of the white balance of the input video signal, errors in the signal processes of the circuit system, and the like can be also adjusted. Therefore, it is possible to obtain the video printer in which the white balance was correctly adjusted and good color reproduction was realized. In addition, since the operator can adjust to a desired white balance while observing the still image signal by a monitor television, by purposely deviating the white balance and adjusting it, the more effective color reproduction can be also obtained.

The detailed operation of the white balance adjuster will be described hereinlater.

Figure 2:
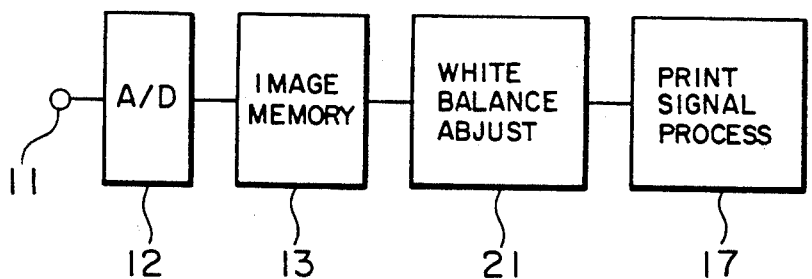

Another construction example of the video printer according to the invention will be described by using FIG. 2.

In the diagram, reference numeral 11 denotes the input terminal; 12 indicates the A/D converter; 21 a white balance adjuster constructed by digital signal processes; and 17 the print signal processing circuit.

It is a feature of the example that the digital signal stored in the image memory 13 is digitally arithmetically operated in the white balance adjuster 15, thereby executing the white balance adjustment. Since the digitized print signal is obtained by the signal A/D conversion, the generation of noises due to the A/D conversion is small, a high quality print signal can be obtained, and the advantages of the digital signal processes can be effected.

Figure 3:
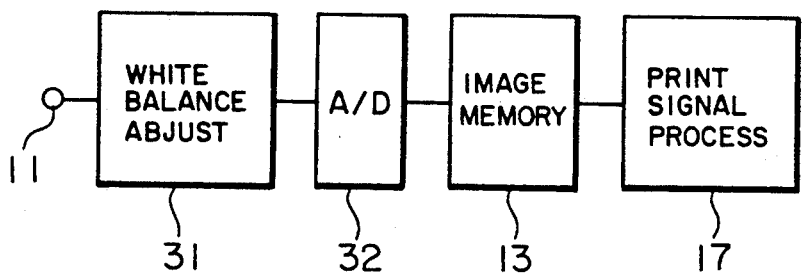

FIG. 3 shows further another construction example of the video printer according to the invention. In the diagram, reference numeral 11 denotes the input terminal; 31 indicates a white balance adjuster; 32 an A/D converter; 13 the image memory; and 17 the print signal processing circuit.

It is a feature of the example that the white balance adjuster 31 is provided before the A/D converter 32 for the image memory 13. According to the embodiment, since the white balance of the image signal stored in the image memory has already been adjusted, the image signal can be immediately printed. On the other hand, the above construction is particularly advantageous for the automatic white balance adjustment in which the white balance is detected from the image signal and the white balance is automatically adjusted.

A practical construction of the video printer according to an embodiment of the invention will now be described by using FIG. 4. In the embodiment, explanation will be made with respect to a video printer of a thermal copy transfer type using a sublimation ink. However, the invention can be also similarly used for a video printer of the ink jet type, current supplying copy transfer type, or silver salt type in which images on a cathode ray tube are photographed.

In the diagram, reference numeral 103 denotes an input terminal of an NTSC video signal; 101 and 102 indicate input terminals of a luminance signal and a color subcarrier modulated color signal (hereinafter, referred to as YC separation signals); 104 a YC separating circuit to separate the NTSC video signal to the YC separation signals; 105 and 106 change-over switches to select the inputs of the NTSC video signal and the YC separation signals; 107 a decoder to demodulate the YC signal into the luminance signal and the base band color difference signals (hereinafter, referred to as Y color difference signals); 108 a clamping circuit to DC reproduce the Y color difference signals; 109 an A/D converter for the luminance signal; 110 and 111 A/D converters for the color difference signal; 112 an image memory to store the A/D converted digital data; 113, 114, and 115 D/A converters to D/A convert the signal read out of the image memory 13; 117 a bright adjuster to adjust the brightness of the luminance signal; 118 a contrast adjuster to adjust the amplitude of the luminance signal; 119 an outline adjuster to change the frequency characteristics of the luminance signal; 120 a color adjuster for changing the amplitude of the color difference signal and adjusting the depth of color; 121 a matrix circuit (RGB converting means) to convert the Y color difference signals into the RGB primary color signals; 122 a white balance adjuster for changing the amplitudes of the R signal (red primary color signal) and the B signal (blue primary color signal) so as to have the opposite characteristics and adjusting the color temperatures of the signals; 123 an encoder to modulate the RGB primary color signals into the YC separation signals; 124 a color curtain switch to mute the color signal modulated by the color subcarrier; 125, 126, and 127 through/memory change-over switches each for switching a signal which is output to an output terminal to the input signal as it is or to the signal processed in the video printer; 128 and 129 output terminals for the YC separation signals; 130 an output terminal for the NTSC video signal; 131 a sync separating circuit for separating a sync signal from the input luminance signal and generating a horizontal sync signal and a vertical sync signal; 133 a memory control circuit to control the reading, writing, and the like of a frame memory; 134 a freeze switch to store the video signal into the image memory; 135 a system controller to control the whole video printer; 136 a color selecting switch to switch the signal to be printed synchronously with the color printing operation; 137 a clamping circuit to reproduce the direct current of the selected signal; 138 an A/D converter for the print signal; 139 a line memory to arrange signals for a thermal line head; 140 a half tone control circuit to realize the half tone expression by the thermal head; 141 a thermal line head; 142 a printing mechanism; 143 an adder for adding the YC separation signals of the encoder 123 and making the NTSC video signal; and 144 a print start switch.

The operation will now be described also by using FIG. 4. In the case of inputting the YC separation signals, they are input from the input terminals 101 and 102. In the case of inputting the NTSC video signal, the signal is input from the input terminal 103. Either the inputs of the YC separation signals as they are in the case of the YC separation signals or the inputs after the NTSC video signal was YC separated by the YC separating circuit in the case of the NTSC video signal are selected by the switches 105 and 106. The selected signals are color demodulated by the decoder 107 and input to the clamping circuit 108 as the luminance signal from which the sync signals were eliminated and two color difference signals (R-Y, B-Y) in order to effectively use the dynamic ranges of the A/D converters 109 to 111 at the post stage. The clamping circuit 108 clamps the signals to the DC potentials according to the dynamic ranges of the A/D converters 109 to 111 which are connected at the post stage. The A/D converters 109 to 111 A/D convert the luminance signal and the color difference signals by about 6 to 8 bits, respectively. The A/D converted digital data is recorded into the image memory 112 having the capacity of one frame or one field corresponding to one picture plane of the television. In the sync separating circuit 131, the sync signals of the input signal are separated to produce a horizontal sync pulse (HD) and a vertical sync pulse (VD). The memory control circuit 133 produces an image memory control signal synchronized with the input signal by using the HD and VD as references and writes the digitized video signal into the image memory by a freeze signal from the freeze switch 134.

Then, the memory control circuit 133 sets the image memory 112 into the reading mode and allows the D/A converters 113, 114, and 115 to output the Y color difference signals of the still image corresponding to one picture plane, respectively. In this case, if the through-/memory change-over switches 125, 126, and 127 are switched to the memory side, the still image can be observed by a video monitor connected to the output terminals 128, 129, or 127. Therefore, the operator can adjust to a desired image by using the bright adjuster 117, contrast adjuster 118, outline adjuster 119, color adjuster 120, and white balance adjuster 122. In the case of the image which was photographed by using a home-use video camera or video movie, a visual problem hardly occurs in the CRT monitor. However, in many cases, the white balance adjustment to adjust the color temperature is insufficient. In the video printer to obtain hard copies, if the white balance adjustment is executed, the good color reproducibility can be easily obtained.

After completion of the image adjustment, the operator starts the printing operation by operating the print start switch 144. By the control of the system controller 135, the color selecting switch 136 sequentially switches the color signals necessary to print synchronously with that a print paper, an ink, and a thermal head execute predetermined operations by the printing mechanism 142. The selected color signal is clamped by the clamping circuit 137 and, thereafter, it is converted into the digital signal by the A/D converter 138 and stored into the line memory 139 corresponding to the heat generating elements of the thermal head. In the half tone control circuit 140, synchronously with the printing mechanism 142, the data in the line memory 139 is converted into current supply pulses corresponding to the data, the current supplying time to the thermal head 141 is controlled, and a color video print is obtained as dark and shade states of the ink on the print paper. At this time, the system controller 135 controls the color curtain switch 124 by a control signal synchronized with the progress of the printing operation. There is executed the movement of a color curtain such that the still image which is printed on the video monitor is separated into a color image and a black and white image The progressing state of the printing operation is informed to the operator.

In the embodiment, the operator can check the effect of the white balance adjustment by the video monitor in a manner similar to the adjustments of the contrast, color, and the like. Therefore, not only the print in which the white balance was correctly adjusted can be obtained but also the print in which the white balance was purposely deviated can be obtained.

In the embodiment, the Y color difference signals have been recorded in the image memory 112. However, even when constructing so as to record the RGB primary color signals and the NTSC video signal, it is sufficient to execute the white balance adjustment at the stage when the signal was converted into the RGB primary color signals. The invention can cope with various memory systems.

On the other hand, when limiting to the still image input, there is no need to particularly have the image memory. Explanation will now be made hereinbelow with respect to a video printer apparatus having the memory of the Y color difference memory type.

Figure 5:
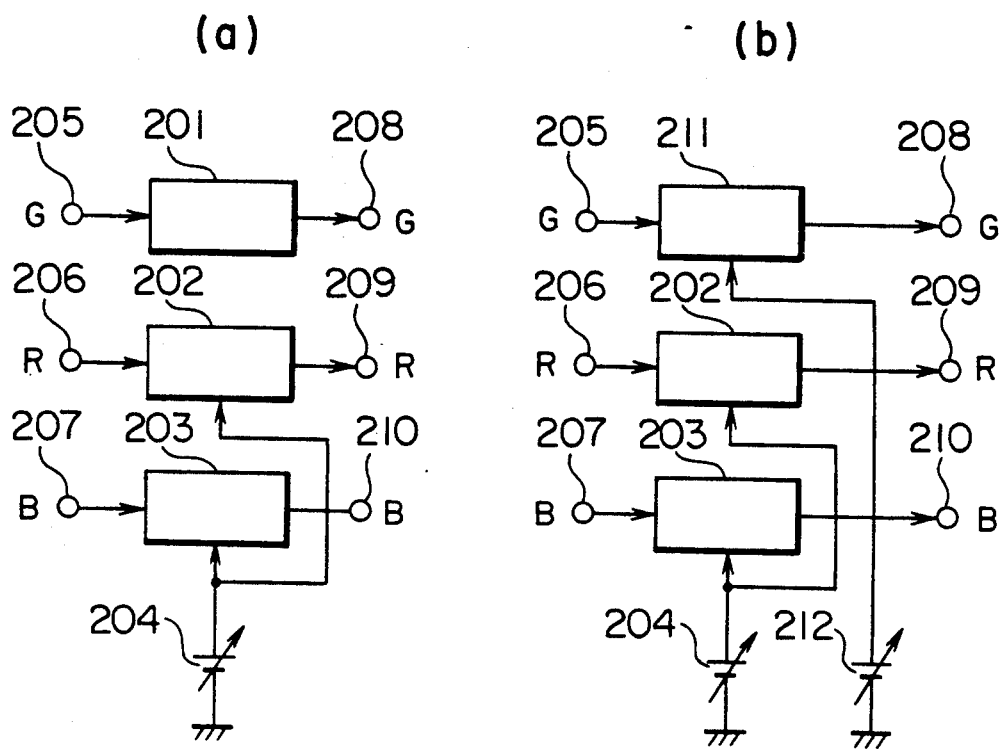
FIGS. 5a and 5b are constructional diagrams of white balance adjuster in FIG. 4.
Figure 6:
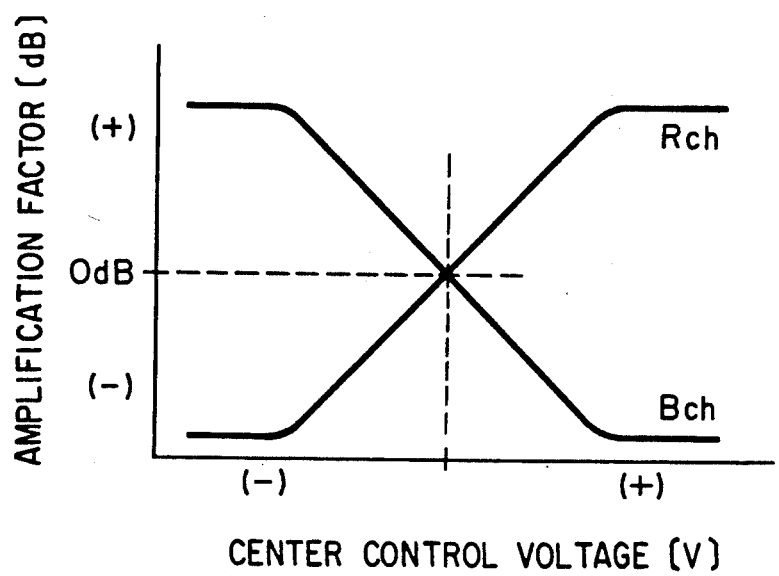
FIG. 6 is a diagram for explaining the operation of the white balance adjuster.

A construction of the white balance adjuster 122 in FIG. 4 will now be described in detail by using FIG. 5(a). FIG. 5(a) is a diagram of an internal construction of the white balance adjuster 122. In the diagram, reference numeral 205 denotes an input terminal of a G signal (green primary color signal); 206 an input terminal of an R signal (red primary color signal); 207 an input terminal of a B signal (blue primary color signal); 201 a buffer amplifier having an amplification factor of 0 db; 202 and 203 variable gain type amplifiers; 204 a manual control signal generator of the variable gain type amplifiers; 208 an output terminal of the G signal; 209 an output terminal of the R signal; and 210 an output terminal of the B signal. The outputs of the matrix 121 in FIG. 4 are input to the input terminals 205, 206, and 207. The output terminals are connected to the encoder 123 and switch 136 in FIG. 4. The operation will now be described by using FIGS. 5(a) and 6. The G signal is input to the input terminal 205 from the output of the matrix 121 in FIG. 4 and is amplified by the buffer amplifier 201 at the amplification factor of 1 and is output to the output terminal 208. Similarly, the R signal is input to the input terminal 206 from the output of the matrix 121 and is amplified by the variable gain type amplifier 202 and is output to the output terminal 209. Similarly, the B signal is input from the input terminal 207 and is amplified by the variable gain type amplifier 203 and is output to the output terminal 210. The operator can change the control voltages of the variable gain type amplifiers 202 and 203 by operating the control signal generator 204. The variable gain type amplifiers 202 and 203 are the amplifiers such that changes in amplification factors exhibit the opposite characteristics by the control voltage. FIG. 6 shows characteristics of the control voltage to the amplification factors of the variable gain amplifiers 202 and 203. The characteristics of the variable gain amplifier 202 are shown as Rch in FIG. 6. The characteristics of the variable gain amplifier 203 are shown as Bch. The two variable gain amplifiers 202 and 203 are set such that when one of the amplification factors increases, the other decreases. That is, if the control voltage of the control signal generator is located at the center in FIG. 6, the variable gain amplifiers 202 and 203 operate as amplifiers of the amplification factor 1 and the color temperature does not change. If the control voltage is set to (+) by the operation, the amplification factor of Rch increases and the amplification factor of Bch decreases. That is, as compared with the state at the center, the color temperature of the signal can be reduced. On the contrary, if the control voltage is set to (−), the color temperature of the signal can be raised. Since the apparatus operates as mentioned above, upon photographing, even if the white balance has been set to be higher or lower than the actual color temperature of the light source and the photographing has been executed, by setting the control voltage, the white balance can be readjusted to the inherent white balance. In the operating section of the control signal generator 204, a variable resistor with a center click such that the center can be seen is used.

In the embodiment, the G signal is used as a reference and the amplification factors of the R and B signals are changed. In general, although the enough effect is obtained by the above system, there is a case where the effect is insufficient when a light source, a fluorescent lamp, or the like having a special spectrum is used. In such a case, the amplitude of the G signal is also made variable.

FIG. 5(b) shows an embodiment in which the amplitude of the G signal can be also varied. The same parts as those in FIG. 5(a) are designated by the same reference numerals. FIG. 5(b) differs from FIG. 5(a) with respect to a point that a variable gain type amplifier 211 is provided for the G signal and a control signal generator 212 is provided to control the amplifier 211. The amplification factor of the G signal can be adjusted independently of the R and B signals. In the embodiment, the white balance can be more accurately adjusted.

To adjust the white balance in accordance with the color temperature of the light source, it is accomplished by matching the amplitudes of the three primary color signals of R, G, and B so that the white portion in the video signal becomes white. The above processes are executed by the signal processes of the video camera in the ordinary photographing mode. Prior to photographing, a white object or an object whose color is regarded as white (ordinarily, a chart such as a gray scale is used) is photographed under the same illuminating conditions as those in the photographing, and the amplification factors of the RGB three-primary color signal processing system are adjusted so as to equalize the output amplitudes. However, since such operations are troublesome, in the home-use video movie, there is frequently used a system in which a color temperature sensor is provided separately from the image pickup device (in general, called an external photometric system), a system in which white color information is extracted from the photographing signal (internal photometric system), or the like. There is a case where the complete white balance is not derived. In the case of video printing, it is necessary to more accurately adjust.

Figure 7:
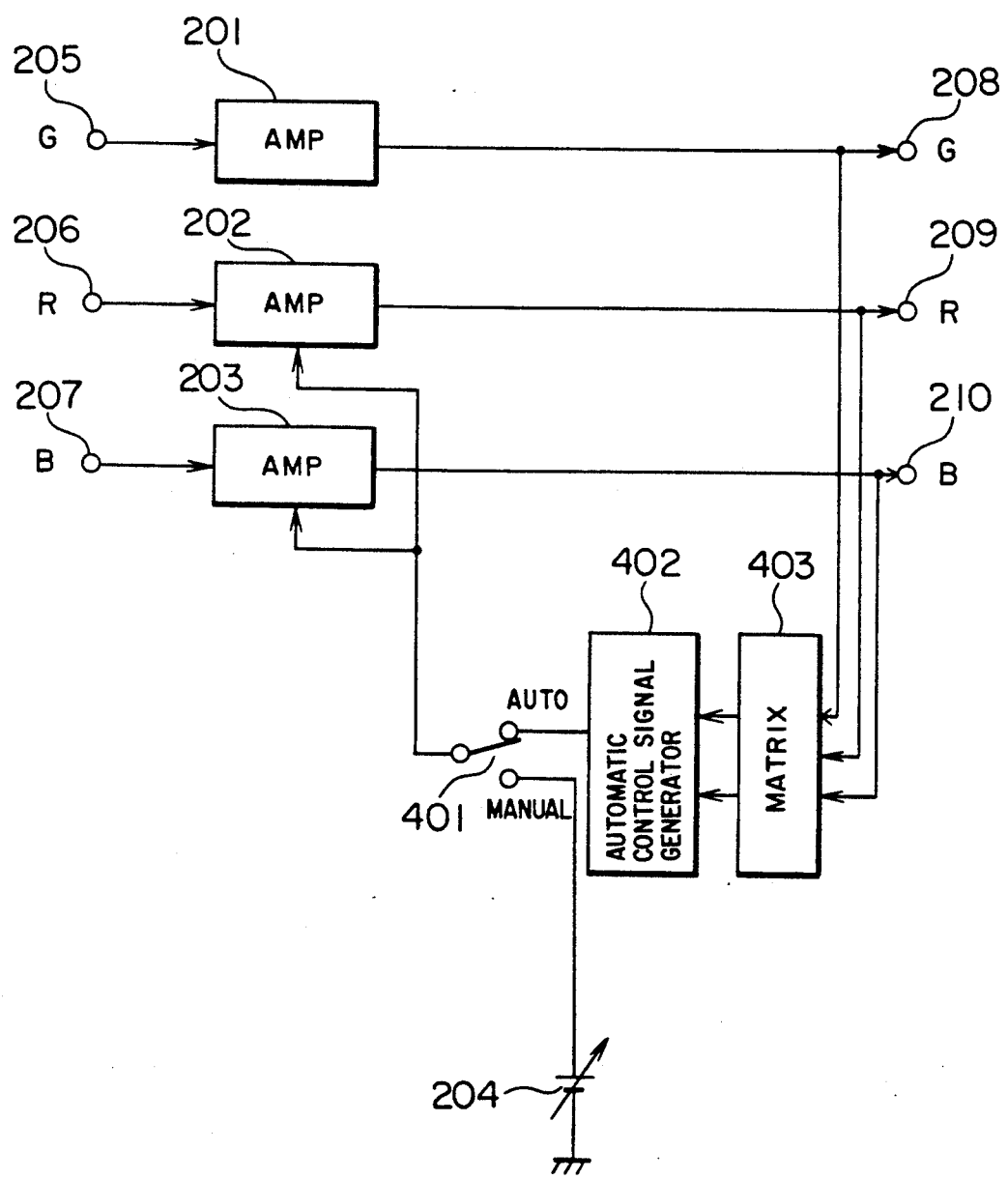
FIG. 7 is another constructional diagram of the white balance adjuster in FIG. 4.

Another embodiment of the white balance adjuster 122 in FIG. 4 will now be described by using FIG. 7. The embodiment intends to automatize the white balance adjustment.

In the diagram, reference numeral 403 denotes a matrix to produce the Y color difference signals from the RGB primary color signals; 402 indicates an automatic control signal generator to generate the control voltages of the variable gain amplifiers 202 and 203; 204 the control signal generator to generate the control voltage by the operation of the operator; and 401 a change-over switch to switch the automatic control signal generator 402 and the control signal generator 204. The other same portions as those in FIG. 5 are designated by the same reference numerals.

The operation will now be described. When the switch 401 is switched to the "manual" side, the same operation as that in the embodiment shown in FIG. 5(a) is executed. That is, the white balance of the signal can be changed by the operation of the operator. The embodiment is characterized by providing an automatic control loop in addition to it.

In general, the video signal has a nature such that when the whole picture plane is integrated, it becomes almost achromatic color. Such a nature has been known as a logic of R. M. Evans, "Intergrate to Gray". An example in which such a logic is applied to the still photograph of the silver salt system has been disclosed in "Film Technology", (The Broadcasting Society of Japan, by supervision of Ryo Takahashi), page 34. On the other hand, since the two color difference signals of R-Y and B-Y are the signals indicative of the color of the video signal, if the signals are integrated and the variable gain amplifiers 202 and 203 are controlled so as to further reduce the amplitude, the video signal is set to an almost achromatic color as a whole and the white balance can be matched. At this time, if a high saturation portion exists in the picture plane, an erroneous operation easily occurs. Therefore, after the signal such as to enlarge the error was eliminated by using a limiter or the like, the process is executed. The automatic control signal generator 402 generates the automatic control signal by the method as mentioned above. The above method is the same as the internal photometric system of the video movie in terms of the principle. The complete operation cannot be expected. However, such a method is effective in the video printer in which the same light source as that used for photographing cannot be obtained. On the other hand, in the case where a good result is not obtained by the automatic control in a special scene, by switching the switch 401 to the manual side, a desired color temperature of the operator can be set.

In the embodiment, a good video print can be obtained for any input signal by the automatic control in the case of the ordinary video signal or by the manual operation in the case where errors are large due to the automatic control. In the embodiment, explanation by the analog processes has been made. However, the similar effect is also obtained by the digital arithmetic operating processes. The white balance adjustment by the digital processes is used in the embodiment of FIG. 2.

As a system of the white balance automatic control which can be applied to the embodiment, there is a method disclosed in Toshio Murakami et al., "The Examination of the Automatic White Balance System for Color Video Camera", Proceedings, Lectures of National Conference, the Institute of Television Engineers of Japan, page 83, 1986.

Figure 8:
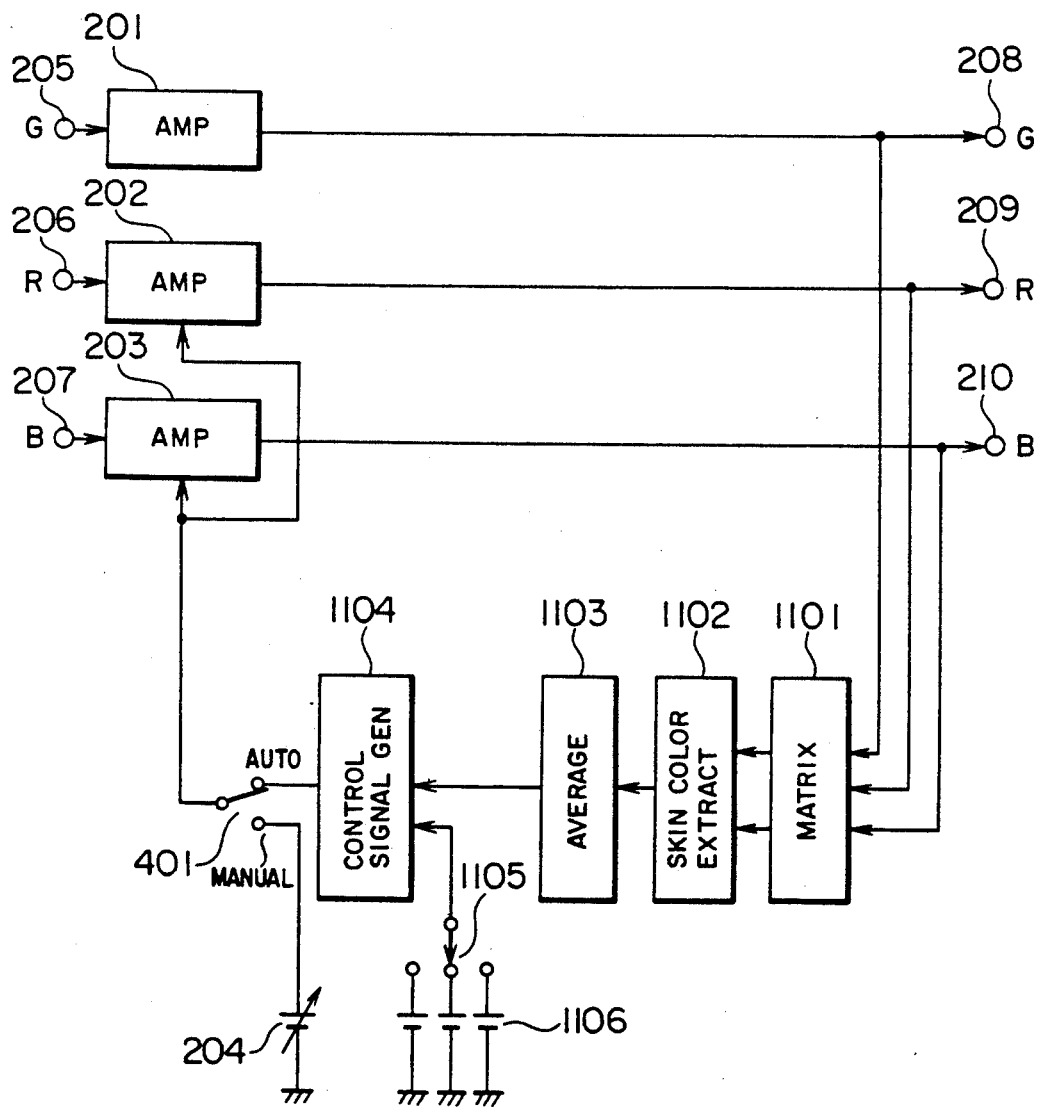
FIG. 8 is further another constructional diagram of the white balance adjuster in FIG. 4.

Another embodiment of the white balance adjuster 122 which can be used in the embodiment of FIG. 4 will now be described by using FIG. 8. The embodiment intends to automatize the white balance adjustment by, particularly, paying an attention to the reproduction of the skin color.

In the diagram, reference numeral 1101 denotes a matrix to produce the Y color difference signals from the RGB primary color signals; 1102 indicates skin color extracting means for extracting the skin color and colors near it from the video signal; 1103 averaging means for averaging the skin color signal extracted by the skin color extracting means 1102; 1106 a skin color reference signal generator; 1105 a selecting switch of a skin color reference signal; and 1104 control signal generating means. The other same portions as those in FIGS. 5 and 7 are designated by the same reference numerals.

The operation will now be described. When the switch 401 is switched to the "manual" side, the same operation as that in the embodiment shown in FIG. 5(a) is executed That is, the white balance of the signal can be changed by the operation of the operator. The embodiment is characterized by providing an automatic control loop by, particularly, paying an attention to the skin color in addition to it.

Figure 9:
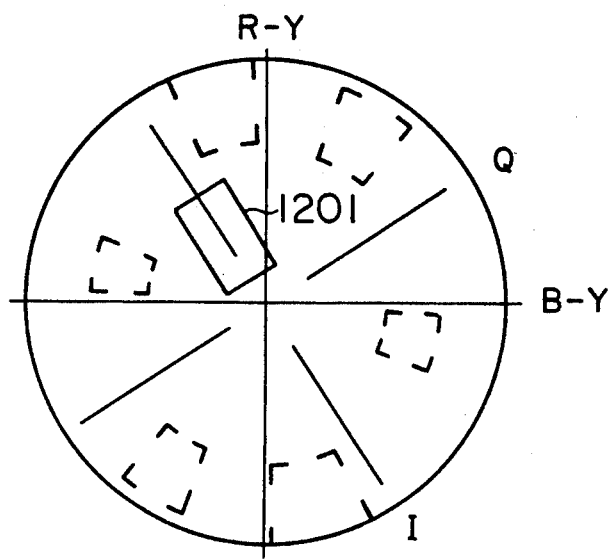
FIGS. 9, 10a and 10b are diagrams for explaining the embodiment of FIG. 8.
Figure 10:
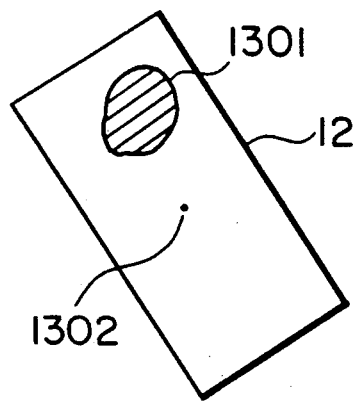
Figure 10:
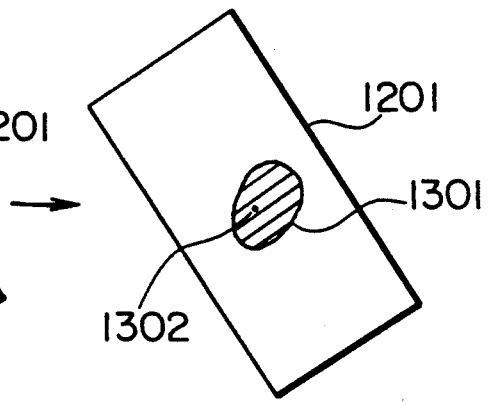

The operation when the switch 401 is switched to the "auto" side will be described by using FIGS. 8, 9, and 10. The matrix 1101 in FIG. 8 produces, for instance, the Y color difference signals to extract the skin color from the RGB primary color signals. The skin color extracting means 1102 extracts the signal near the skin color from the above signals. This is shown in FIG. 9. FIG. 9 shows a vector scope. In the diagram, the signal near the skin color as shown by 1201 is extracted by the skin color extracting means 1102. Such an extracting process can be realized by gating the signals such as R−B−2Y and R+B−2Y which were produced from the RGB primary color signals by the matrix on the basis of a predetermined threshold value level. The averaging means 1103 averages the extracted skin color signal and transmits to the control signal generating means 1104. The control signal generating means 1104 compares the skin color signal which was extracted and averaged and the skin color reference signal selected by the switch 1105 and generates a control signal to the amplifiers 202 and 203. The skin color reference signal generator 1106 generates a reference signal corresponding to the standard skin color (the standard skin color of Japanese is equal to 123 degree on the vector scope). In FIG. 8, a plurality of skin color reference signal generators 1106 are provided and a desired reference value of the operator can be selected by the switch 1105. By presetting the standard values such as "fair skin color", "sunburnt skin color", and the like into the reference signal, it is possible to cope with various skin colors. FIG. 10 shows a state of control. The diagram enlargedly shows an extracting range of the skin color extracting means 1102. Reference numeral 1301 denotes a skin color signal in the video signal and 1302 indicates a reference skin color signal selected by the switch 1105. FIG. 10(a) shows a state before the control. FIG. 10(b) shows a state after the control. Since the average signal near the skin color of the video signal is controlled so as to coincide with the skin color reference signal, the skin color in the video signal can be made approach the standard skin color.

In the embodiment, since the white balance of the signal is controlled by paying an attention to the skin color portion of a man, it is particularly optimum to obtain a video print of the image of the man. On the other hand, by providing a plurality of reference skin colors, the invention can cope with various skin colors. Although the embodiment copes with the skin color of Japanese, the invention is not limited to Japanese but can be obviously applied to various persons by changing the setting of the characteristics of the skin color extracting portion and the reference skin color signal.

On the other hand, the invention ca also cope with a video printer with an overlay function shown in FIGS. 11, 13, 14, and 15, which will be explained hereinafter.

An embodiment of the invention in the video printer with the overlay function will now be described by using FIG. 11. Prior to explaining, the overlay function will be described by using FIG. 12.

Figure 11:
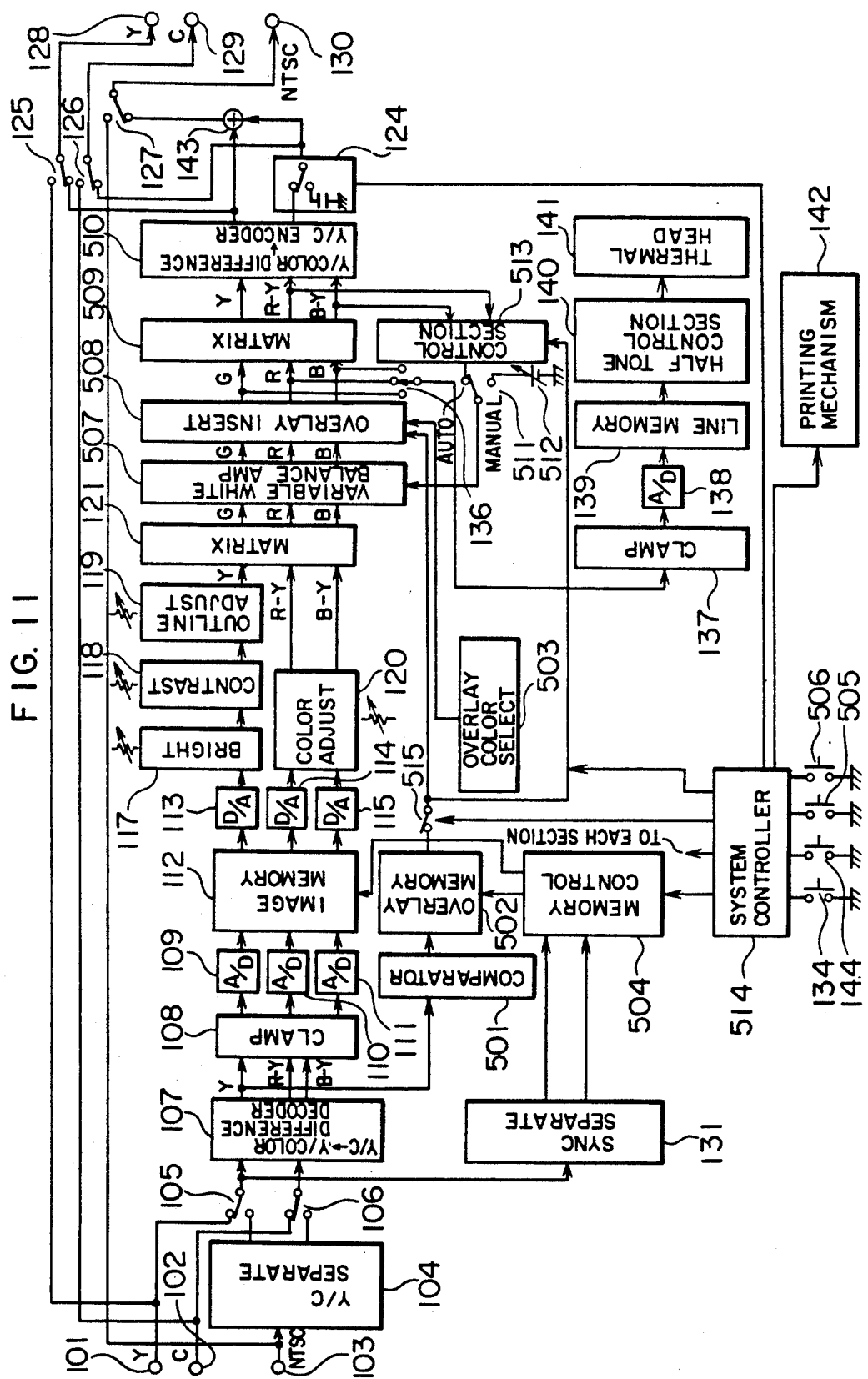
FIG. 11 is a block diagram of a video printer with an overlay function according to another embodiment of the invention.

FIG. 12(a) is a diagram showing the content of the image memory 112 in FIG. 11. FIG. 12(b) is a diagram showing the content of an overlay memory 502 in FIG. 11. FIG. 12(c) is a diagram showing an overlaid print or monitor image.

When an image is printed, there is a case where the operator wants to simultaneously print a memorandum, a message, or the like. A method of realizing it corresponds to the overlay function. For instance, a hand-written character as shown in FIG. 12(b) can be overlaid onto an image of FIG. 12(a) by a desired color.

The embodiment of the video printer with the overlay function will be described by using FIG. 11.

Figure 4:
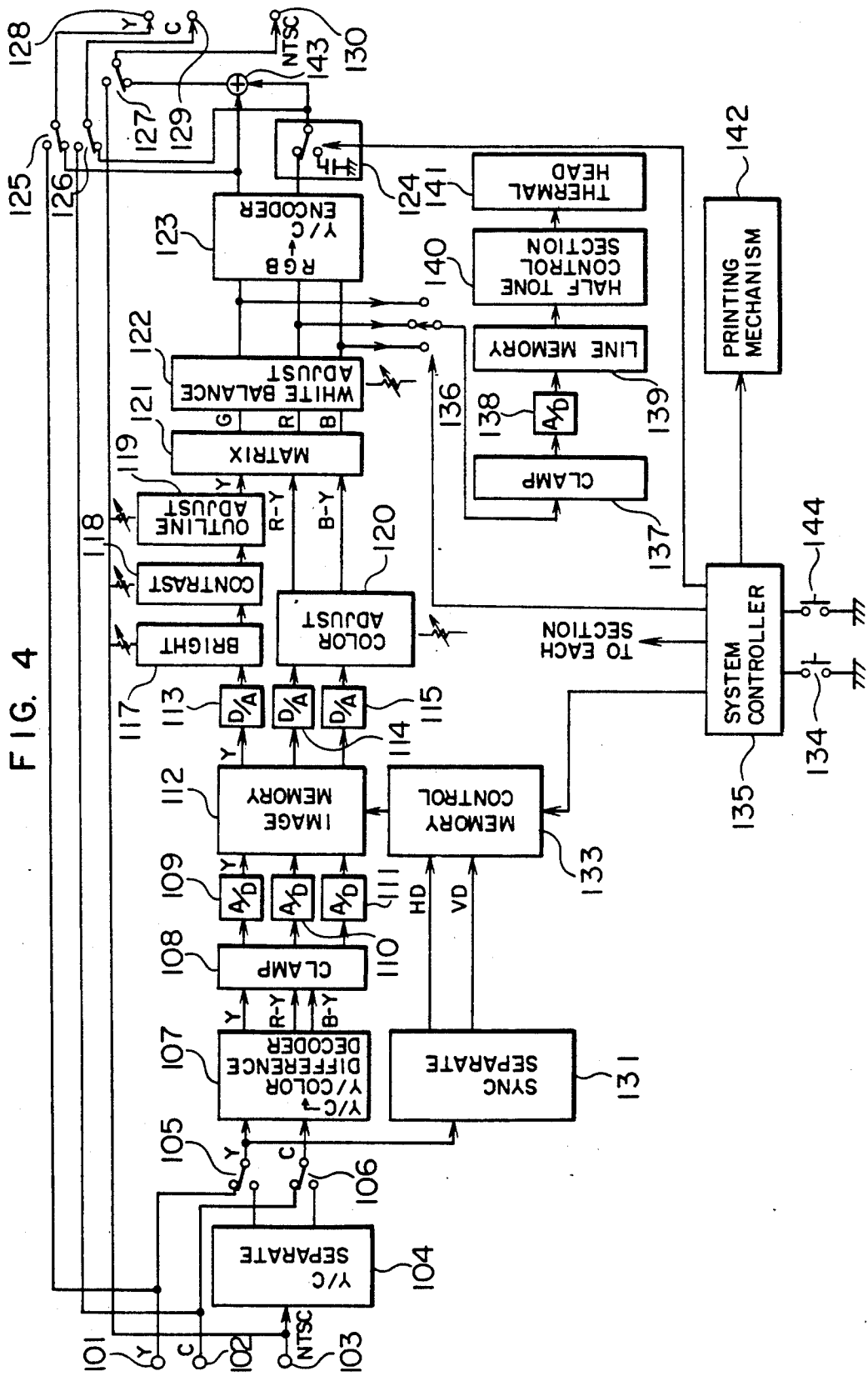
FIG. 4 is a block diagram of a video printer according to an embodiment of the invention.

The same portions as those in FIG. 4 are designated by the same reference numerals. In the diagram, reference numeral 501 denotes a comparator to convert the Y signal into the 0 or 1 signal; 502 indicates the overlay memory having a depth in the digitizing direction of one bit of one frame or one field; 504 a memory control circuit; 503 an overlay color selecting circuit to select the color of the overlay portion; 515 a switch to connect and disconnect an output of the overlay memory; 507 a variable white balance amplifier in which an amplifier portion in FIG. 5 is made independent; 508 an overlay inserting means for switching the color signal selected by the overlay color selecting circuit 503 and the video signal from the image memory synchronously with the output of the overlay memory; 505 a freeze switch of the overlay memory; 506 a switch to select the color of the overlay; 509 a matrix to produce the Y color difference signals from the RGB three primary color signals; 510 an encoder to convert the Y color difference signals into the YC signals; 513 a control circuit for the variable white balance amplifier; 512 a control signal generator which is operated by an operator; and 511 a change-over switch.

Figure 12:
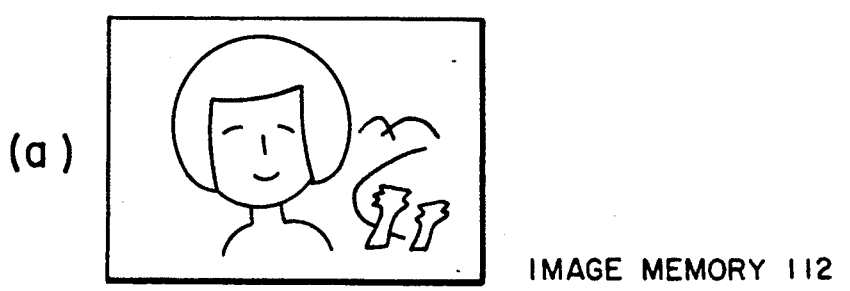
FIGS. 12a-12c are diagrams for explaining the overlay function.
Figure 12:
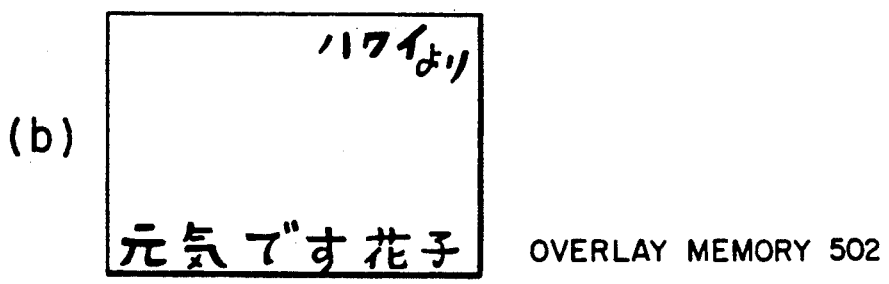
Figure 12:
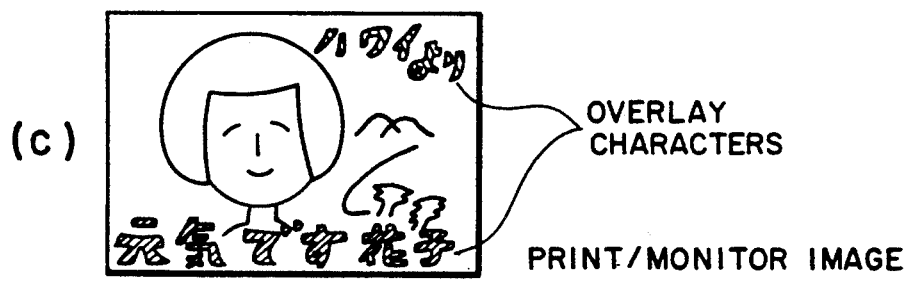

The operation will now be described by using FIGS. 11 and 12. In a manner similar to that described in FIG. 4, the memory control circuit 504 produces an image memory control signal by the operation of the freeze switch 134. The image as shown in FIG. 12(a) is frozen in the image memory 112. In the case where the operator wants to overlay the hand-written characters as shown in, for instance, FIG. 12(b) to such an image and to print, a telop (such that contrast characters were written onto a proper paper) like FIG. 12(b) is formed and is photographed by the video camera and is input from the input terminal 101, 102, or 103. The Y signal decoded by the decoder 107 is A/D converted into the on/off signal of 0 and 1 by the comparator 501 on a bit unit basis. That is, separation is performed just in the portion of the characters and the portion of the paper as a background and the image of FIG. 12(b) is obtained and recorded into the overlay memory 502. Next, when the memory is set into the reading mode, the contents of the image memory 112 are D/A converted by the D/A converters 113 to 115 and respectively adjusted. Thereafter, the adjusted signals are input to the overlay inserting means 508. On the other hand, the content of the overlay memory 502 is input to the overlay inserting means 508 through the switch 515. The color signal of the overlay portion determined by the overlay color selecting circuit 503 is also input to the overlay inserting means 508. The overlay inserting means 508 switches the video signal from the image memory 112 and the color signal from the overlay color selecting circuit 503 at the timing of the signal from the overlay memory 502, thereby forming the overlaid video signal as shown in FIG. 12(c). Now, the operator operates the overlay color selecting switch 506 and can change the color signal from the overlay color selecting circuit 503.

The overlaid signal is transmitted through the matrix 509 and is encoded into the monitoring signal by the encoder 510 and is also input to the control circuit 513. In a manner similar to that described in FIG. 7, the control circuit 513 detects the white balance from the video signal and generates an automatic control signal such as to control the variable white balance amplifier 507. However, since the input video signal has already been overlaid, errors easily occur. For instance, in the case where the overlaying process is executed by using the red color signal, red characters are inserted in the video signal. Therefore, since the ratio of red in the whole video signal is large, the control circuit 513 generates a control signal such as to make the signal blue (such as to raise the gain of Bch and to reduce the gain of Rch) to the variable white balance amplifier 507. To prevent it, in the embodiment, the signal in which the overlay portion is blanked is formed from the video signal by using the output of the overlay memory 502 and the control signal is produced from such a signal.

Figure 13:
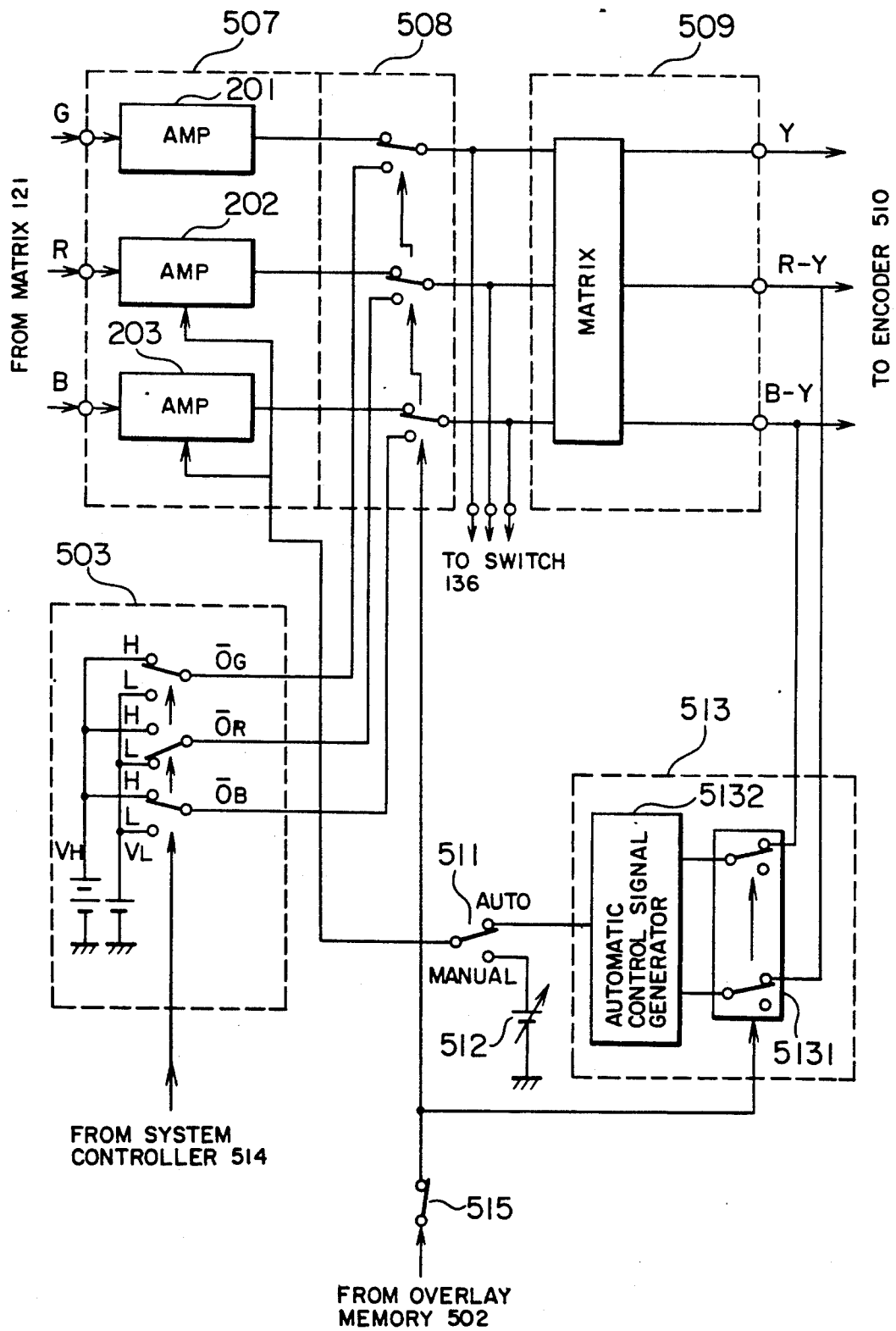
FIG. 13 is a constructional diagram showing a part in FIG. 11 in detail.

The above construction will now be described in detail by using FIG. 13.

In the diagram, reference numeral 507 denotes the variable white balance amplifier; 508 the overlay inserting means; 509 the matrix; 503 the overlay color selecting circuit; and 513 the control circuit. The above components correspond to the portions of the same reference numerals in FIG. 8, respectively. Reference numeral 5131 denotes blanking means and 5132 indicates an automatic control signal generating circuit.

The operation will now be described. The video signals from the matrix 121 in FIG. 11 are input from the terminals of G, R, and B to the variable white balance amplifier 507. They are the signals corresponding to (a) in FIG. 12. The overlay color selecting circuit 503 selects the color of the overlay portion on the basis of the signal from a system controller 514. For instance, in FIG. 13, since the G and B signals are set to the high level and the R signal is set to the low level, the color of the overlay portion is set to cyan and corresponds to the color of the overlay character portion in FIG. 12(b). The overlay inserting means 508 simultaneously switches the two kinds of the video signal and overlay color signal with respect to RGB three primary colors on the basis of the signal from the overlay memory, so that the overlaid video signal as shown in FIG. 12(c) are output. The signals are converted into the Y color difference signals by the matrix 509 and are input to the encoder 510 and control circuit 513. In the control circuit 513, after the signal of the overlay portion was blanked by the blanking means 5131, it is sent to the automatic control signal generating circuit 5132. On the basis of such a signal, the automatic control signal generating circuit 5132 generates a white balance control signal. Therefore, a situation such that the automatic control signal generating circuit 5132 erroneously operates due to the color signal of the overlay portion does not occur. On the other hand, the manual operation by the control signal generator 512 can be also executed by the switching of the switch 511.

According to the embodiment, there is a feature such that even in the video printer with the overlay function, errors of the automatic white balance control are not generated due to the overlay.

Figure 14:
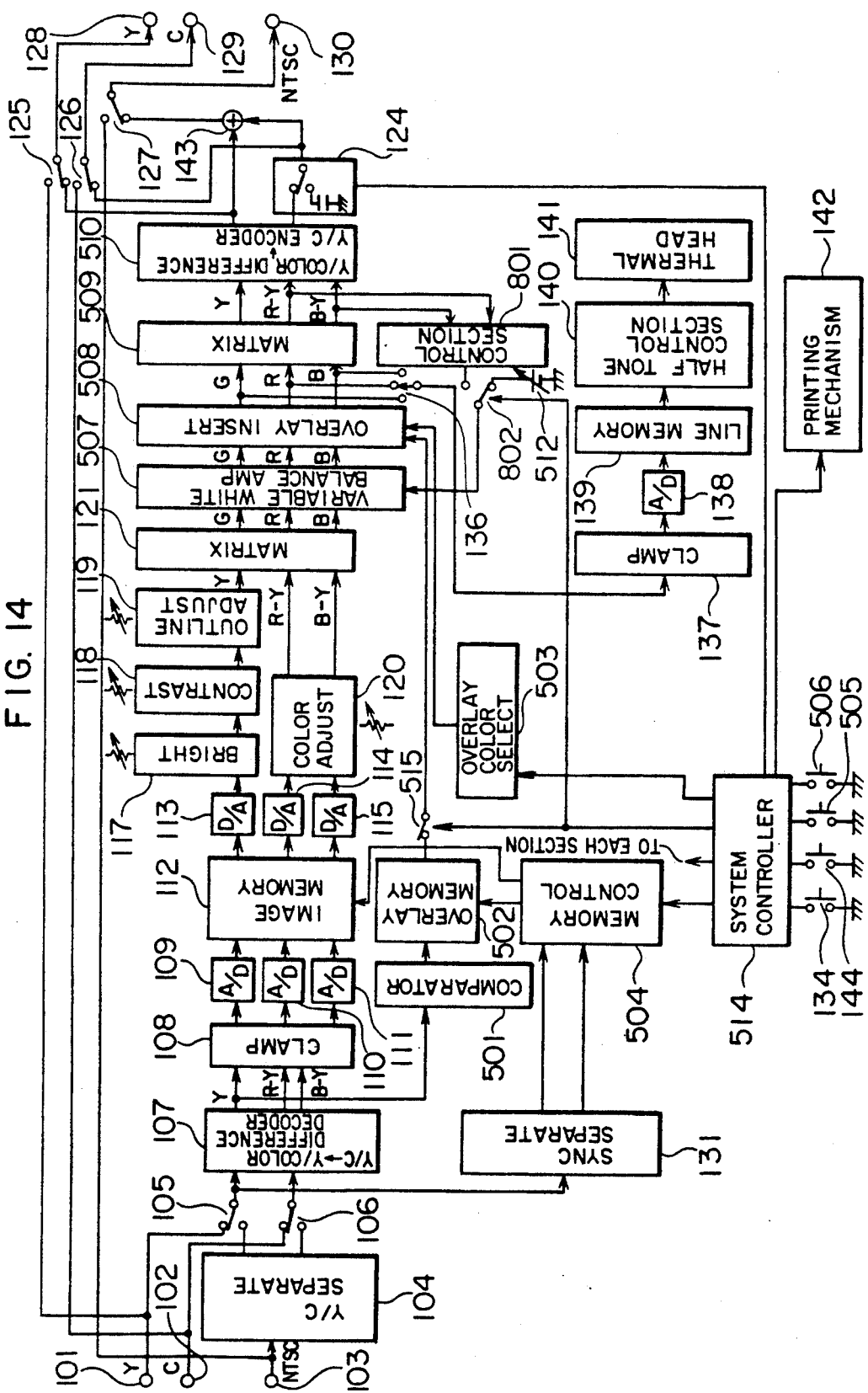
FIGS. 14 and 15 are block diagrams of video printers with the overlay function according to other embodiments of the invention.

FIG. 14 shows another embodiment of the video printer with the overlay function.

In the diagram, reference numeral 801 denotes a control circuit for the variable white balance amplifier; 512 indicates the control signal generator for the operator; and 802 a change-over switch. The other same portions as those in the other drawings are designated by the same reference numerals. It is a feature of the embodiment that the control signal of the variable white balance amplifier 507 is forcedly switched to the "manual" side in interlocked with the overlay switch 515. That is, simultaneously with the control of the on/off switch 515 of the overlay, the control signal to the variable white balance amplifier 507 is switched to the output of the control signal generator 512. On the other hand, the control circuit 801 does not need the blanking means of the control section 513 in FIG. 13.

In the embodiment, the automatic control loop of the white balance is released simultaneously with the operation of the overlay function. Therefore, the white balance is not deteriorated by the overlay. Upon operation of the overlay function, the white balance is matched by the operation of the operator. For instance, as in the case of inserting an image to a part in the overlaid figure, the embodiment is particularly effective in the case where the ratio of the image which is occupied by the overlay is large and the ratio of the video image from the image memory is small and it is difficult to obtain the information of the white balance from the video signal, or the like. On the other hand, the automatic control can be also realized if the white balance information detected from the video signal before the overlay is executed (before the switch 515 is turned on) is held in the control signal generator 512.

Figure 15:
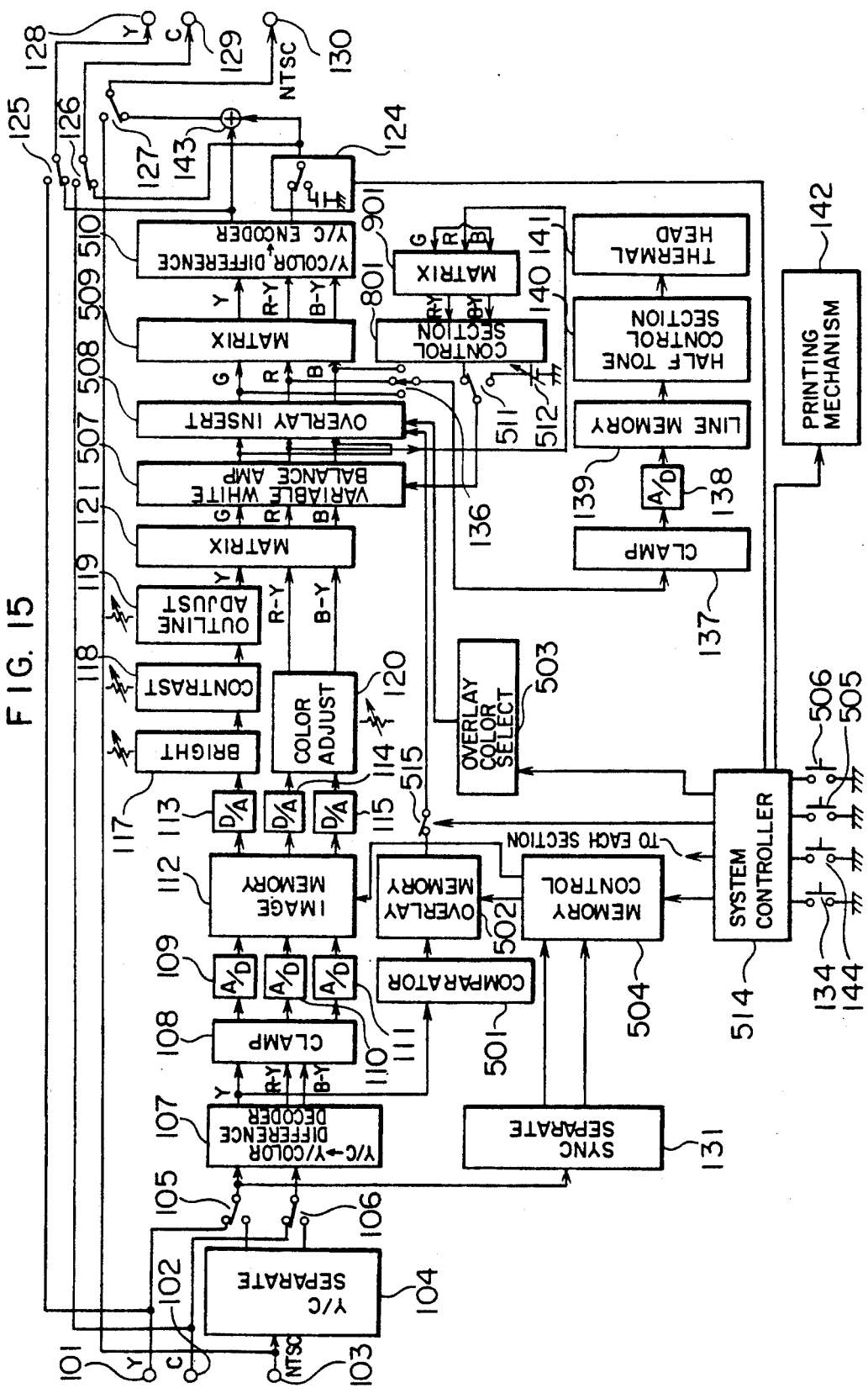

FIG. 15 shows another embodiment.

In the diagram, reference numeral 901 denotes a matrix to convert the RGB signals into the Y color difference signals; 801 indicates the control circuit of the variable white balance amplifier 508; 512 the control signal generator for the operator; and 511 the change-over switch.

The operation of the embodiment will be described. The video signals of the image memory 112 are converted into the RGB primary color signals by the matrix 121 and are input to the overlay inserting means 508 and the matrix 901. The overlay inserting means 508 overlays the video signals and transmits the overlaid signals to the monitor television through the matrix 509 and to the printing circuit section through the color selecting switch 136. On the other hand, the outputs of the matrix 901 are sent to the control circuit 801. Although the control circuit 801 produces a white balance control signal from the video signal, the signals which are not overlaid are input from the variable white balance amplifier 507 through the matrix 901 irrespective of the presence or absence of the overlay. Therefore, no error or the like due to the overlay is generated. In the embodiment, even in the video printer with the overlay function, the white balance is accurately adjusted irrespective of the on/off of the overlay and a video print in which the good color reproduction was realized can be obtained.

Figure 16:
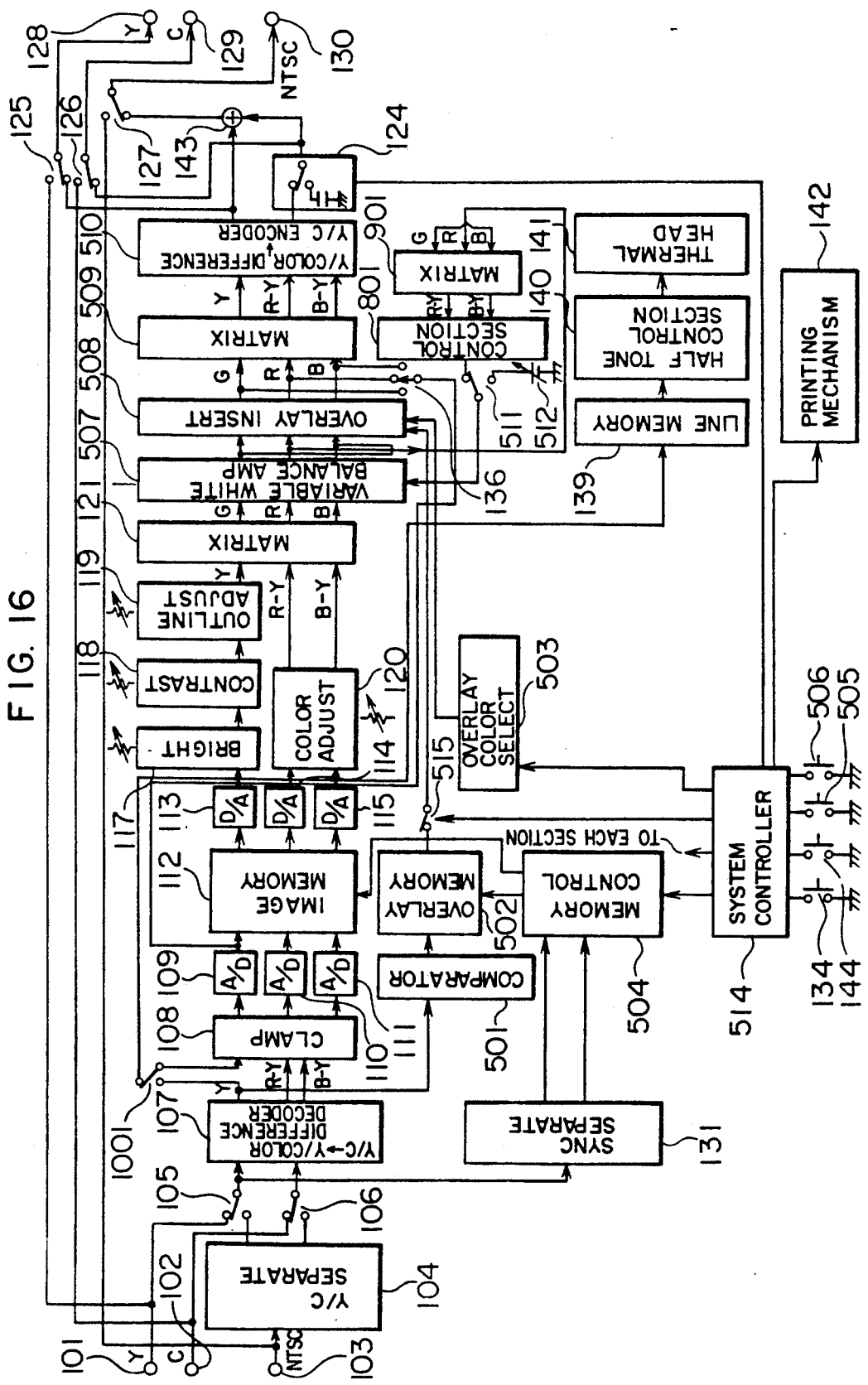
FIG. 16 is a block diagram of a video printer which commonly uses A/D converters according to another embodiment of the invention.

FIG. 16 shows an embodiment in which the A/D converters are commonly used. In the diagram, reference numeral 1001 denotes a signal change-over switch of the memory and the print. In the embodiment, the clamping circuit 108 and the A/D converter 109 are commonly used in place of the clamping circuit 137 to print and the A/D converter 138 to print in the embodiment of FIG. 15 and are switched and used by the switch 1001.

According to the embodiment, since the number of relatively expensive A/D converters which are used can be reduced, the costs of the video printer can be reduced. On the other hand, since the comparator 501 can be also regarded as a 1-bit A/D converter, it can be also replaced by the MSB output of the A/C converter 109. The common use of the A/D converters can be also accomplished even in the embodiments of FIGS. 1, 4, 11, 14, and 15.

According to the invention, since the white balance of the video signal can be detected and adjusted, a video print in which the good color reproduction was realized can be also obtained even from the video signals photographed in a state in which the white balance is deviated. In addition, even in a combination with the overlay function, a good print can be also similarly derived.

We claim:

1. A color video printer apparatus comprising:
   first A/D converting means for A/D converting input video signals;
   memory means for storing outputs of said first A/D converting means, said output representing a still image of one picture plane of a television;
   D/A converting means for D/A converting signals of the still image of one picture plane read out of the memory means;
   RGB converting means for converting outputs of the D/A converting means into RGB video signals;
   white balance adjusting means for changing amplification factors among the RGB video signals;
   second A/D converting means for A/D converting the RGB video signals; and
   means for color printing outputs of the second A/D converting means.

2. An apparatus according to claim 1, wherein said white balance adjusting means receives the RGB video signals representing the still image of one picture plane, detects the white balance from the RGB video signals and automatically executes the white balance adjustment.

3. An apparatus according to claim 1, wherein said white balance adjusting means comprises:
   a manual adjusting circuit;
   an automatic adjusting circuit for detecting the white balance from the RGB video signals and automatically executing the white balance adjustment; and
   a switch for selectively switching between said manual adjusting circuit and said automatic adjusting circuit.

4. A color video printer apparatus comprising:
   A/D converting means for A/D converting RGB video signals;
   color printing means for color printing;
   skin color detecting means for detecting a signal near the skin color from the RGB video signals;
   means for generating a reference skin color signal;
   means for detecting a white balance from the video signals;
   white balance adjusting means for changing amplification factors between the RGB video signals; and
   means for controlling the white balance adjusting means so that the detected skin color signal coincides with the reference skin color signal.

5. A color video printer apparatus comprising:
   first A/D converting means for A/D converting input video signals;
   first memory means for storing outputs of the first A/D converting means;
   D/A converting means for D/A converting the signals read out of the first memory means;
   RGB converting means for converting outputs of the D/A converting means into RGB video signals;
   comparator means for converting the input video signals into binary digital signals;
   second memory means for storing outputs of the comparator means;
   color selecting means for determining respective levels among R, G, and B of the RGB video signals to be overlaid;
   automatic white balance adjusting means which is connected to the RGB converting means and detects a white balance from the RGB video signals and automatically changes amplification factors among the RGB video signals;
   overlay inserting means for switching between outputs of the automatic white balance adjusting means and an output of the color selecting means in accordance with outputs of the second memory means;
   blanking means connected to the overlay inserting means for blanking an overlaid signal from input video signals to the blanking means in accordance with outputs of the second memory menas, thereby to produce a white balance control signal which is supplied to the automatic white balance adjusting means;
   second A/D converting means for A/D converting outputs of the overlay inserting means; and
   means for color printing outputs of the second A/D converting means.

6. An apparatus according to claim 5, wherein at least two means, among the first and second converters and the comparator are connected so as to be commonly used as one A/D converter.

7. A color video printer apparatus comprising:
   first A/D converting means for A/D converting input video signals;
   first memory means for storing outputs of said first A/D converting means;
   D/A converting means for D/A converting signals read out of the first memory means;
   RGB converting means for converting outputs of the D/A converting means into RGB video signals;
   comparator means for converting the input video signals into binary digital signals;
   second memory means for storing outputs of the comparator means;
   color selecting means for determining respective levels among R, G, and B of the RGB video signals to be overlaid;
   white balance adjusting means which is connected to the RGB converting means and detects a white balance from the RGB video signals and automatically changes amplification factors among the RGB signals;
   overlay inserting means for switching between outputs of the white balance adjusting means and the color selecting means in accordance with outputs of the second memory means;
   manual white balance adjusting means for manually adjusting the white balance;
   switching means for switching between said two adjusting means in a manner such as to select the manual white balance adjusting means when executing an overlay insertion;
   second A/D converting means for A/D converting outputs of the overlay inserting means; and
   means for color printing outputs of the second A/D converting means.

8. An apparatus according to claim 7, wherein at least two means among the first and second A/D converters and the comparator are connected so as to be commonly used as one A/D converter.

9. A color video printer apparatus comprising:
   first A/D converting means for A/D converting input video signals;

first memory means for storing outputs of the A/D converting means;

D/A converting means for D/A converting signals read out of the first memory means;

RGB converting means for converting outputs of the D/A converting means into RGB video signals;

comparator means for converting the input video signals into binary digital signals;

second memory means for storing outputs of the comparator means;

color selecting means for determining levels of the video signals to be overlaid;

overlay inserting means for switching outputs of the RGB converting means and an output of the color selecting means in accordance with outputs of the second memory means;

second A/D converting means for A/D converting outputs of the overlay inserting means;

means for color printing outputs of the second A/D converting means;

automatic white balance adjusting means which is provided between the D/A converting means and the second A/D converting means and detects a white balance from the RGB video signals and automatically changes amplification factors among the RGB signals, said automatic white balance adjusting means being connected such that signals at the front stage of the overlay inserting means are input to the automatic white balance adjusting means;

manual white balance adjusting means for manually adjusting the white balance; and switching means for switching between said two white balance adjusting means.

10. An apparatus according to claim 9, wherein at least two means among said first and second converters and the comparator means are connected so as to be commonly used a one A/D, converter.

* * * * *